March 22, 1938.   G. P. KIMMEL   2,112,163
MANIPULATIVE BRIDGE FOR BIFOCAL LENSES
Filed Nov. 6, 1937
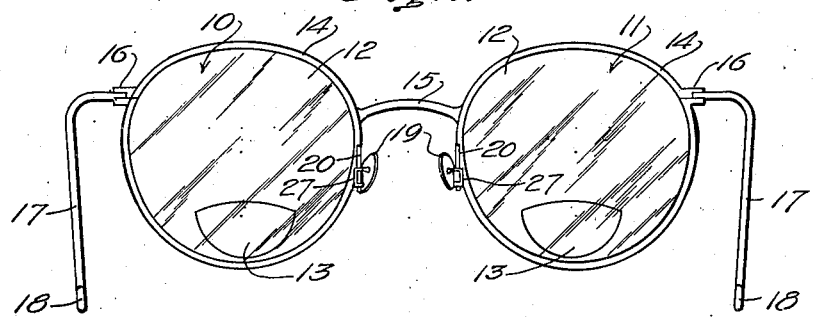
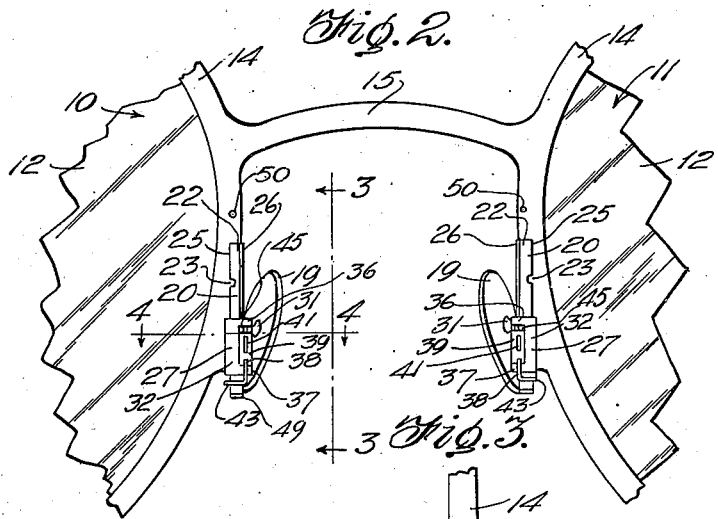
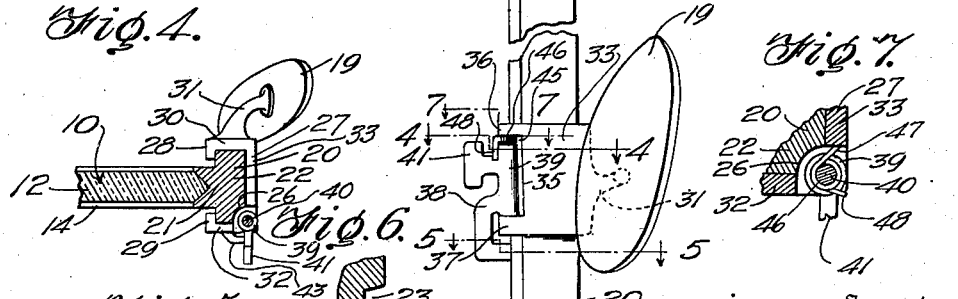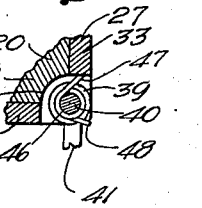
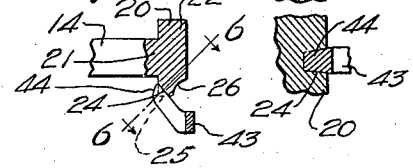
Inventor
GEORGE P. KIMMEL,
By Kimmel & Crowell,
Attorneys.

Patented Mar. 22, 1938

2,112,163

UNITED STATES PATENT OFFICE 2,112,163

MANIPULATIVE BRIDGE FOR BIFOCAL LENSES

George P. Kimmel, Brookville, Md.

Application November 6, 1937, Serial No. 173,230

2 Claims. (Cl. 88—49)

This invention relates to an improved manipulative bridge for spectacles or the like having bifocal lenses.

Bifocal lenses as now commonly made are arranged with the lens of the shortest focus, generally termed the reading lens, at the bottom and the lens of the longest focus, that is the distance lens at the top. As the distance lens is the one normally used and the reading lens is used only when one is reading, it is the usual practice to make the distance lens of a larger area than the reading lens and when the glasses are worn the axis of the distance lens is positioned in front of the lens of the eye. The reading lens, however, lies below the level of the lens of the eye which causes the wearer when reading to look downwardly so that the angle of vision is not normal and a resulting unnecessary strain is placed upon the eyes. Some persons find it difficult to turn their eyes as required in this manner and to say the least they find it most annoying.

It has been proposed to provide spectacles or the like with a nose bridge which might be shifted into one of two positions so as to bring either the reading lens or the distance lens opposite the lens of the eyes of the user so that no additional strain would be placed upon the eyes regardless of which lens is being used. Such devices while satisfactory from the standpoint of eliminating additional eye strain due to an abnormal angle of vision have been objectionable in other respects. For example, it has been necessary to remove the eye spectacles or glasses from the face in order to adjust the bridge to bring the other lens into a position opposite the lens of the eye.

In view of the foregoing, it is an object of the present invention to provide an adjustable mounting for use with bifocal lenses which may be adjusted readily to bring either lens of the spectacles opposite the lens of the eye without any need for removing the spectacles or eye glasses from the face. Another object of this invention is to provide an improved means for manipulating the spectacles. A further object is to provide means which do not mar the appearance of the spectacles. A further object is to provide manipulative means which are readily and easily actuated. Another object is to provide a manipulative means which is pleasing in appearance. Another object of the invention is to provide spectacles of the bifocal type which are so constructed that a person using them need not turn his eyes downwardly to see through the reading lens. Other objects and advantages of this invention may be ascertained from the following description when taken in connection with the accompanying drawing.

In the drawing wherein like numerals indicate corresponding parts in the various figures, Fig. 1 is an elevation showing a pair of spectacles of the bifocal type to which has been applied the features of this invention.

Fig. 2 is an enlarged partial elevation showing the essential features of the invention.

Fig. 3 is a partial side elevation, on an enlarged scale and corresponding to a view along the line 3—3 in Fig. 2.

Fig. 4 is a transverse cross section along the line 4—4 in Figs. 2 or 3.

Fig. 5 is a cross section on the line 5—5 in Fig. 3.

Fig. 6 is a vertical partial section on the line 6—6 in Fig. 5.

Fig. 7 is a transverse cross section on the line 7—7 in Fig. 3.

Referring to the drawing, a preferred embodiment of the invention has been shown in Figures 1 to 7 inclusive as applied to a pair of spectacles having bifocal lenses. Although the invention is herein particularly described in connection with spectacles, it is to be understood that the features of this invention may be equally well applied to eye glasses which do not use temple bars for retaining the glasses upon the face of the wearer. It will be further understood that wherever the term "nose pads" is used, this term is used in its broad sense to define those parts of the glasses or spectacles regardless of the particular structure, which rest upon the nose and support the spectacles.

Referring to Figure 1, the invention is illustrated as applied to a pair of spectacles having nose rests of the pad arm and pad type. The spectacles include a pair of lenses 10 and 11 each of which comprises a distance vision portion 12 and a reading vision portion 13. Each bifocal lens is surrounded by an eye-wire 14. The eye-wire or other parts of the frame may be made of zylonite, shell, gold, gold filled metal, or any other metallic or non-metallic type of material which is satisfactory. The eye-wires are shown as being split and having their abutting edges secured together to form a friction hinge 16. To each friction hinge is secured a temple member or spectacle bow 17 having a customary loop portion 18 for securing the spectacles behind the ears of the wearer. The two eye-wires are interconnected as by means of a nose bridge 15 at the nasal sides of the lenses. Below the bridge and connected with the eye-wires are nose rests or pads 19 mounted on arms rearwardly offset with respect to the planes of the lenses. Although the spectacles as described and shown have the nose bridge piece and eye-wire integral it will be readily understood that the nose bridge member may be secured with the nasal side of the lenses by lens straps. Also the hinge joints, by means of which the temple pieces are attached to the eye-wires, may be connected to the lenses by end pieces. The invention thus also contemplates the adaptation of the novel features thereof to spectacles which do not have eye-wires but which dispense with the eye-wires and which have the temple members and bridge member secured directly to the lenses.

The eye-wires as herein described are preferably formed on the nasal sides thereof with an integral enlargement 20 which extends laterally with respect to the front and rear faces of each lens. This enlargement 20 provides a guide or slideway which with the adjacent portion of the eye-wire is substantially T-shaped in cross section and which extends along that portion of the eye-wire which is adjacent the nose of the wearer. The T section guide has the stem 21 of the T as an integral part of the eye-wire and the head 22 of the T extending in a plane at right angles to the plane of the lens. The head part of the T is substantially rectangular in cross section. It is preferably provided with two spaced notches 23 and 24 in its outwardly facing corner or edge 25 of the outer laterally extending part of the guide. The outwardly facing nasal corner of the guide is undercut to provide a clearance 26 for certain elemental parts of the device when in use. These parts are hereinafter described.

A slide or clamp member 27 substantially in the form of a channel as clearly shown in Figure 4, having its open side partly closed by the inturned flanges 28 and 29 is arranged for slideable engagement with the guide 20 of the eye-wire. One side wall 30 of the clamp is provided with an integral arm 31 at the other end of which is mounted one of the nose pads 19. The arm 31 is so constructed as to be relatively yieldable so that the position of the spectacles can be readily adjusted to the facial contour of a particular individual. The end wall 33 and side wall 32 of the slide 27 have an interconnecting edge in common which is partly cut away as at 35 leaving an upper bearing portion 36 and a lower bearing portion 37.

An oscillatable member 38 having an integral sleeve portion 39 is pivotally carried upon a spindle 40 which is secured to and which extends between the upper and lower bearing portions 36 and 37. The sleeve has an outwardly extending integral arm portion 41 which may be grasped by the finger to effect the pivotal movement of the sleeve about its spindle 40. The lower end of the sleeve 38 is provided with an integral arm 43 having a tapered end 44.

The notches 23 and 24 in the guide are tapered as clearly observed in Figure 6. By means of the tapered end 44 of the latch arm 43 the guide 20 can be raised or lowered with respect to the slide and latched in the particular position by allowing the arm 43 to engage one or the other of the notches 23 and 24.

In order to retain the latch arm 43 in engaged position with respect to one of the notches, means is provided for biasing the sleeve member 39 in the position shown in Figure 4. This biasing is accomplished by relatively simple means. The sleeve portion 39 of the member 38 is fore-shortened so as to provide a gap 45 between the top of the sleeve and the bottom face of the upper bearing portion 36. In this space and about the spindle 40 is positioned a spring member 46. One end 47 of the spring is arranged to engage the wall 33 of the slide and the other end 48 is arranged to rest upon the arm 41. In this manner, the spring always retains the latch in the position shown in Figure 4. Now in order to release the latch and allow the lenses to be moved relatively with respect to the nose pads so that either the reading or distance portion of the lens will be placed in front of the eyes, it is merely necessary for the person wearing the spectacles to grip the arms 41 by the thumb and forefinger and to press them toward each other so as to release the latches. Bridge piece 15 is then movable toward or away from the nose pads so that the spectacles are arranged in the position in which the wearer wishes to use them.

A stop 49 is provided at the lower end of each slideway to prevent the slide from running off the bottom. A stop 50 is provided above the top of each slideway to prevent the slide from running off the top.

Although a preferred embodiment of this invention is illustrated and described, variations within the true spirit and scope of the same are to be determined by the appended claims.

What I claim is:

1. In a pair of spectacles having bifocal lenses mounted in eye wires with the latter interconnected by a nose bridge and provided with temple members the combination of a manipulative nose rest structure of the pad-arm type, said structure including an enlarged portion of substantially T-shape cross-section on the nasal side of each eye wire forming a guide element, each of said guide elements having at least two spaced notches and the outer edge thereof facing away from its outer nasal side; a partly closed hollow channel shaped slide element having the recess thereof so formed that the slide element may slide and be retained upon said guide; a nose pad arm and nose pad secured to said slide element; and a latch member having a central sleeve portion pivotally mounted upon said slide element, with a latch arm extending laterally and downwardly from said sleeve and arranged to engage in one or the other of said notches, and with a finger engageable arm extending forwardly and outwardly from said sleeve portion, said latch being normally biased to latching position.

2. In a nose piece structure for spectacles or the like having bifocal lenses, the combination of a manipulative nose rest structure; said structure comprising a guide element fixed to the nasal side of each lens and having portions thereof extending forwardly and rearwardly with respect to each bifocal lens, the corner on the nasal side of the forwardly extending portion of each guide element being cut away throughout its extent and the corner on the other side of the forwardly extending portion of each guide element having at least two spaced notches therein to selectively position each lens portion of the bifocals; a C-shaped slide element for each guide element having the outer corner on the nasal side thereof cut away to provide top and bottom bearing portions with an intermediate socket and arranged to slide upon each guide element; a latch element having a sleeve body portion pivotally mounted in the intermediate socket and between the bearing portions of each of said C-shaped slide elements and arranged to ride through the cut away corner of the guide, said latch element having latch and operating arms extending from said sleeve body, the latch arm extending downwardly and laterally so as to be engageable with said notches, the operating arm extending forwardly and outwardly from the sleeve body; a spring biasing said latch into engaged position with respect to said notches; and a nose pad carried by said slide element.

GEORGE P. KIMMEL.